US012129917B2

(12) United States Patent
Fritz et al.

(10) Patent No.: US 12,129,917 B2
(45) Date of Patent: Oct. 29, 2024

(54) DIFFERENTIAL LOCK/UNLOCK POSITION DETECTION

(71) Applicant: Eaton Intelligent Power Limited, Dublin (IE)

(72) Inventors: Todd William Fritz, Kalamazoo, MI (US); John O. Manyala, Kalamazoo, MI (US); Nick Peter Gillette, Ceresco, MI (US); Ken Raymond Anderson, Mattawan, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/107,155

(22) Filed: Feb. 8, 2023

(65) Prior Publication Data

US 2023/0184314 A1 Jun. 15, 2023

Related U.S. Application Data

(63) Continuation of application No. 16/714,957, filed on Dec. 16, 2019, now Pat. No. 11,585,421, which is a
(Continued)

(51) Int. Cl.
*F16H 48/38* (2012.01)
*F16H 57/037* (2012.01)
(Continued)

(52) U.S. Cl.
CPC ........... *F16H 48/38* (2013.01); *F16H 57/037* (2013.01); *G01D 5/12* (2013.01); *F16H 48/34* (2013.01);
(Continued)

(58) Field of Classification Search
CPC ........ F16H 48/34; F16H 48/38; F16H 57/037; F16H 2048/382; F16H 2057/02026; F16H 2057/02043; G01D 5/12
See application file for complete search history.

(56) References Cited

U.S. PATENT DOCUMENTS 4,676,114 A 6/1987 Ida et al.
6,165,095 A 12/2000 Till et al.
(Continued)

FOREIGN PATENT DOCUMENTS

JP 2004211899 A 7/2004

OTHER PUBLICATIONS

International Search Report and Written Opinion for International Application No. PCT/US2018/037788 mailed Sep. 28, 2018.
(Continued)

*Primary Examiner* — Thomas C Diaz
(74) *Attorney, Agent, or Firm* — Merchant & Gould P.C.

(57) ABSTRACT

A sensor assembly configured for use with a locking differential received in a differential case includes a sensor housing, a switch element and a sense element. The sensor assembly is configured to determine a position of an armature in relation to a stator. The armature moves relative to the stator between engaged and disengaged positions corresponding to the locking differential being in a locked and unlocked state. The sensor housing is coupled relative to the differential case of the locking differential. The switch element is disposed in the sensor housing. The sense element moves with the armature. The sensor assembly is configured to change state based on a position of the sense element.

12 Claims, 12 Drawing Sheets

Related U.S. Application Data continuation of application No. PCT/US2018/037788, filed on Jun. 15, 2018.

(60) Provisional application No. 62/520,942, filed on Jun. 16, 2017.

(51) Int. Cl.
*G01D 5/12* (2006.01)
*F16H 48/34* (2012.01)
*F16H 57/02* (2012.01)

(52) U.S. Cl.
CPC .............. *F16H 2048/382* (2013.01); *F16H 2057/02026* (2013.01); *F16H 2057/02043* (2013.01)

(56) References Cited

U.S. PATENT DOCUMENTS

| | | | | |
|---|---|---|---|---|
| 7,264,568 B2 * | 9/2007 | Ludwig | ................ | F16H 48/295 475/233 |
| 9,989,140 B2 * | 6/2018 | Onitake | ................ | F16H 48/24 |
| 10,422,660 B2 | 9/2019 | Creech et al. | | |
| 2007/0197338 A1 * | 8/2007 | Fusegi | ................... | F16H 48/34 475/231 |
| 2008/0122436 A1 * | 5/2008 | Pinkos | ................... | F16H 48/08 324/207.21 |
| 2008/0182702 A1 | 7/2008 | Donofrio et al. | | |
| 2009/0156346 A1 | 6/2009 | Donofrio et al. | | |
| 2015/0133254 A1 * | 5/2015 | Fox | ........................ | F16H 48/22 475/150 |
| 2016/0223064 A1 * | 8/2016 | Yamanaka | ............ | F16D 27/118 |

OTHER PUBLICATIONS

Supplemental European Search Report for EP Application No. 18818671 mailed Dec. 11, 2020.

* cited by examiner

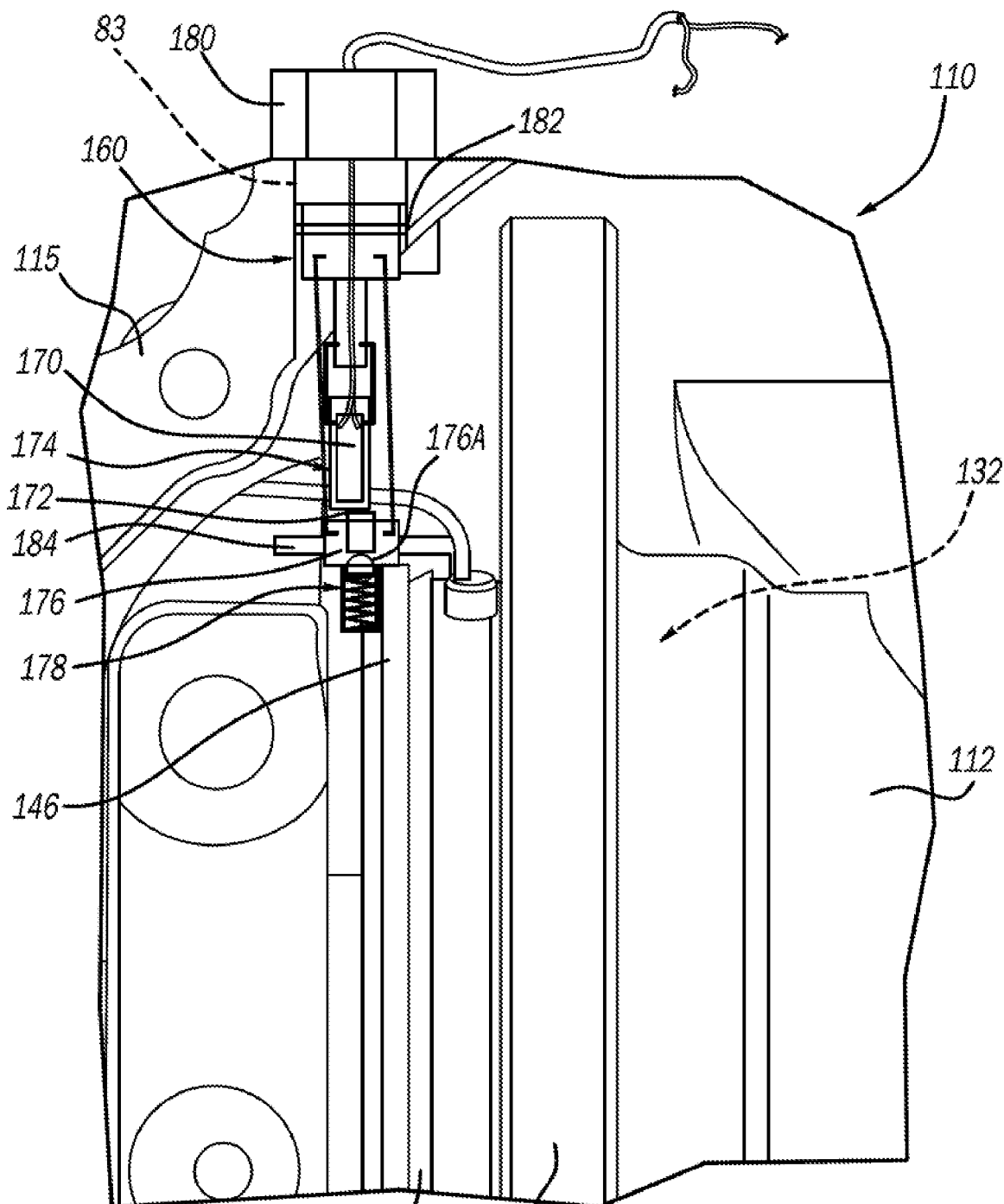
*FIG - 4A*
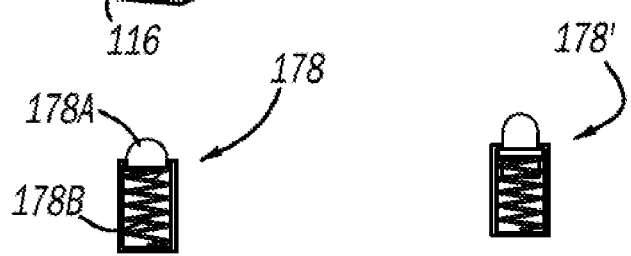
*FIG - 4B*   *FIG - 4C*

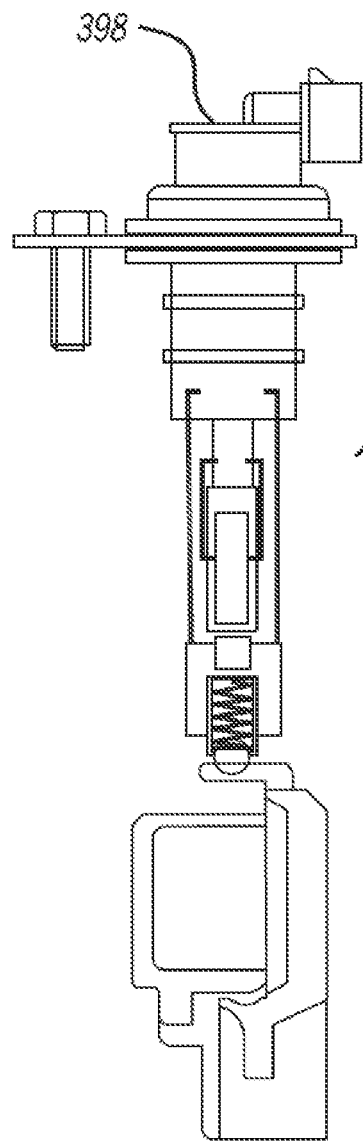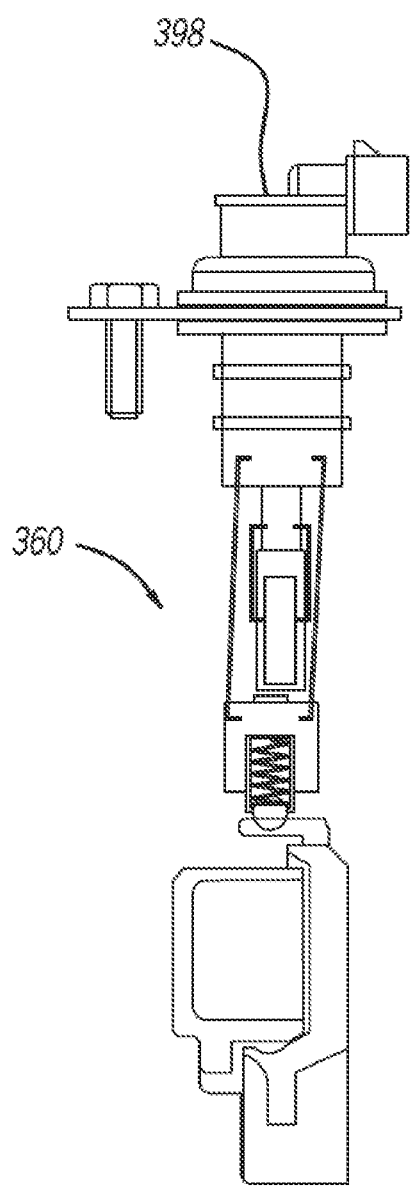
FIG - 9A
FIG - 9B

DIFFERENTIAL LOCK/UNLOCK POSITION DETECTION

CROSS REFERENCE TO RELATED APPLICATIONS

This application is a continuation of U.S. application Ser. No. 16/714,957 filed Dec. 16, 2019, now U.S. Pat. No. 11,585,421; which is a continuation of International Application No. PCT/US2018/037788 filed Jun. 15, 2018, which claims priority to U.S. Provisional Application No. 62/520,942 filed on Jun. 16, 2017. The disclosure of the above applications is incorporated herein by reference.

FIELD

The present teachings relate, in general, to electronically actuated locking differentials and, in particular to an electronically actuated locking differential having a sensor or switch mechanism that determines the position of an armature in relation to a stator in the locking differential.

BACKGROUND

In automotive applications, an electronically actuated locking differential of the related art may be actuated electronically and is designed for forward-wheel-drive (FWD), rear-wheel-drive (RWD), all-wheel-drive (AWD), and four-wheel-drive (4WD) vehicles to allow the differential to be locked or unlocked when it is so desired. The driver can lock the front and/or rear wheels by manually activating a switch or button mounted to a dash or console of the vehicle. In this type of torque-controlling device, the armature is allowed to spin or rotate with the differential and the armature is not mechanically attached to a lock plate within the differential.

While locking differentials of this type have generally worked for their intended purposes, certain disadvantages remain. More specifically, these arrangements limit the ability to electronically sense the locked state of the differential. Further, adding a sensor to a rotating armature might be a cause for increased costs because the sensor is non-contacting. Also, wear and durability become a concern with any sensor being attached to a rotating armature.

SUMMARY

A sensor assembly configured for use with a locking differential received in a differential case includes a sensor housing, a switch element and a sense element. The sensor assembly is configured to determine a position of an armature in relation to a stator. The armature moves relative to the stator between engaged and disengaged positions corresponding to the locking differential being in a locked and unlocked state. The sensor housing is coupled relative to the differential case of the locking differential. The switch element is disposed in the sensor housing. The sense element moves with the armature. The sensor assembly is configured to change state based on a position of the sense element.

In other features, the sense element is a magnet. The sense element can be coupled to the armature. In another configuration, the sense element can be integrated in to the sensor housing. The sense element can be disposed on a mount. The sensor assembly can further comprise a detent mechanism that operably couples the mount relative to the armature. The detent mechanism can be fixed to the armature. The detent mechanism can alternatively be fixed to the mount. The detent mechanism includes a ball that locates relative to a depression formed on an arm extending from the stator.

In additional features, the sensor housing can be configured to flex during movement of the armature between the engaged and disengaged positions. The sensor housing can further comprise a molded connector body. The sensor assembly can be coupled to the differential case by a fastener. The fastener can be a threaded fastener. The sensor assembly can be connected to the differential case by the threaded fastener advanced into a complementary threaded bore defined in the differential case. The sensor assembly can be configured to communicate a signal to vehicle instrumentation to convey a state of the differential. The sensor housing and the switch element are configured to be fixture to an arm extending from the stator. The sensor assembly can be coupled to the differential case by a mounting bracket that is bolted to the differential assembly.

A method of installing a sensor assembly relative to an assembled locking differential is provided. The assembled locking differential has a differential case, a rotation prevention mechanism, and an actuator having an armature. The method includes advancing the sensor assembly through a bore defined in the differential case. A switch element of the sensor assembly is located relative to a sense element disposed on the armature. The sensor assembly is fixed to the differential case.

According to other features, locating a switch element of the sensor assembly comprises fixturing the sense element relative to an arm fixed to the stator. A magnet mount can be coupled to the armature by locating a ball of a detent mechanism disposed on the armature into a recess provided on the detent mechanism. Fixturing the sensor assembly comprises threadably tightening a fastener relative to a complementary threaded bore defined in the differential case.

DRAWINGS

Other aspects of the present teachings will be readily appreciated as the same becomes better understood after reading the subsequent description taken in connection with the accompanying drawings wherein:

FIG. 4A is a side view of a sensor assembly constructed in accordance to another example of the present disclosure and shown mounted to a differential case;

FIG. 4B is a first exemplary detent mechanism according to the present disclosure;

FIG. 4C is a second exemplary detent mechanism according to the present disclosure;

FIG. 9A is a side view of the sensor assembly of FIG. 8A incorporating a molded connector body and shown with the armature disengaged and the switch open;

FIG. 9B is a side view of the sensor assembly of FIG. 9A and shown with the armature engaged and the switch closed;

DETAILED DESCRIPTION

Figure 1:
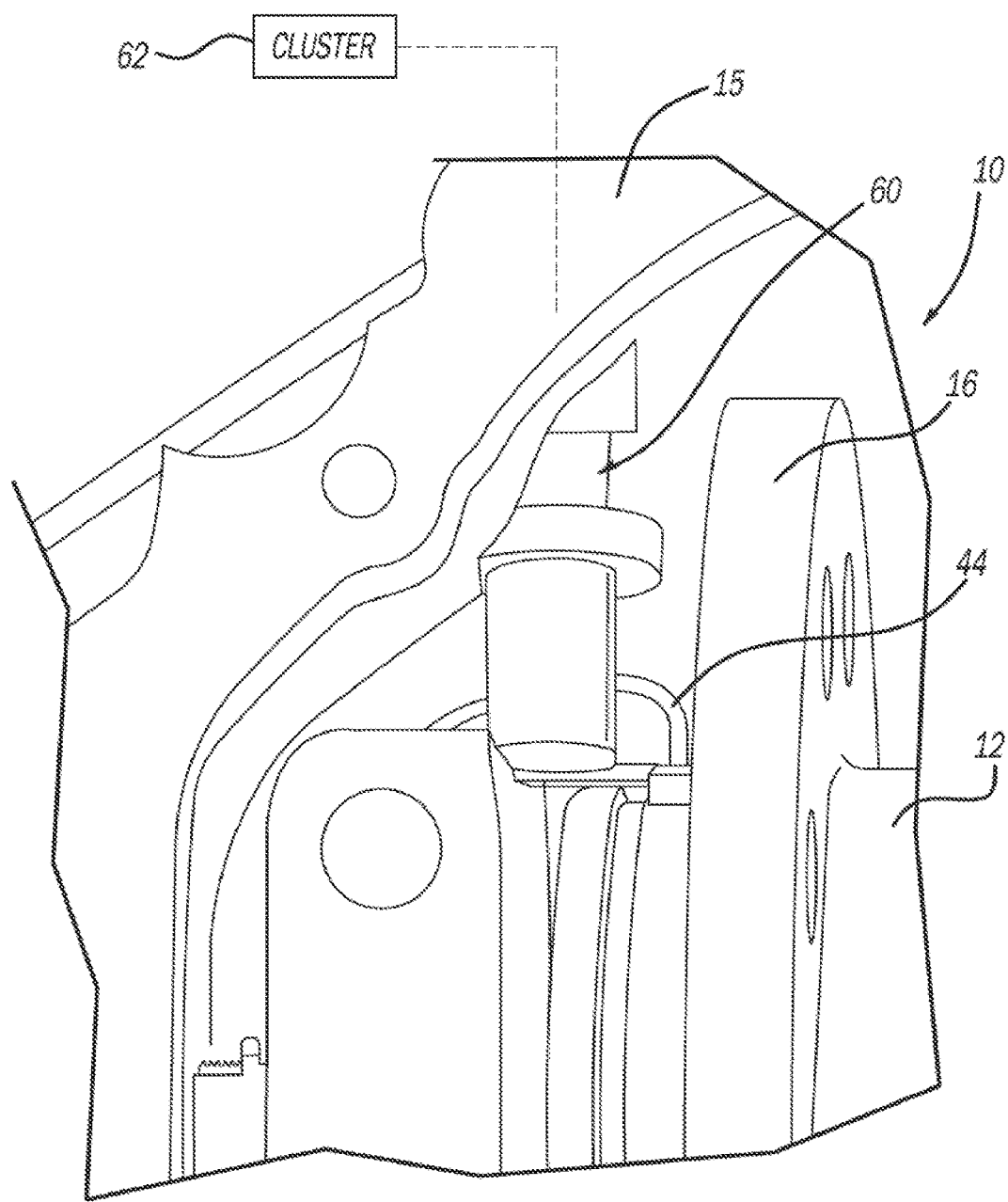
FIG. 1 is a partial perspective fragmentary view of an electronically actuated locking differential of the present teachings.
Figure 2:
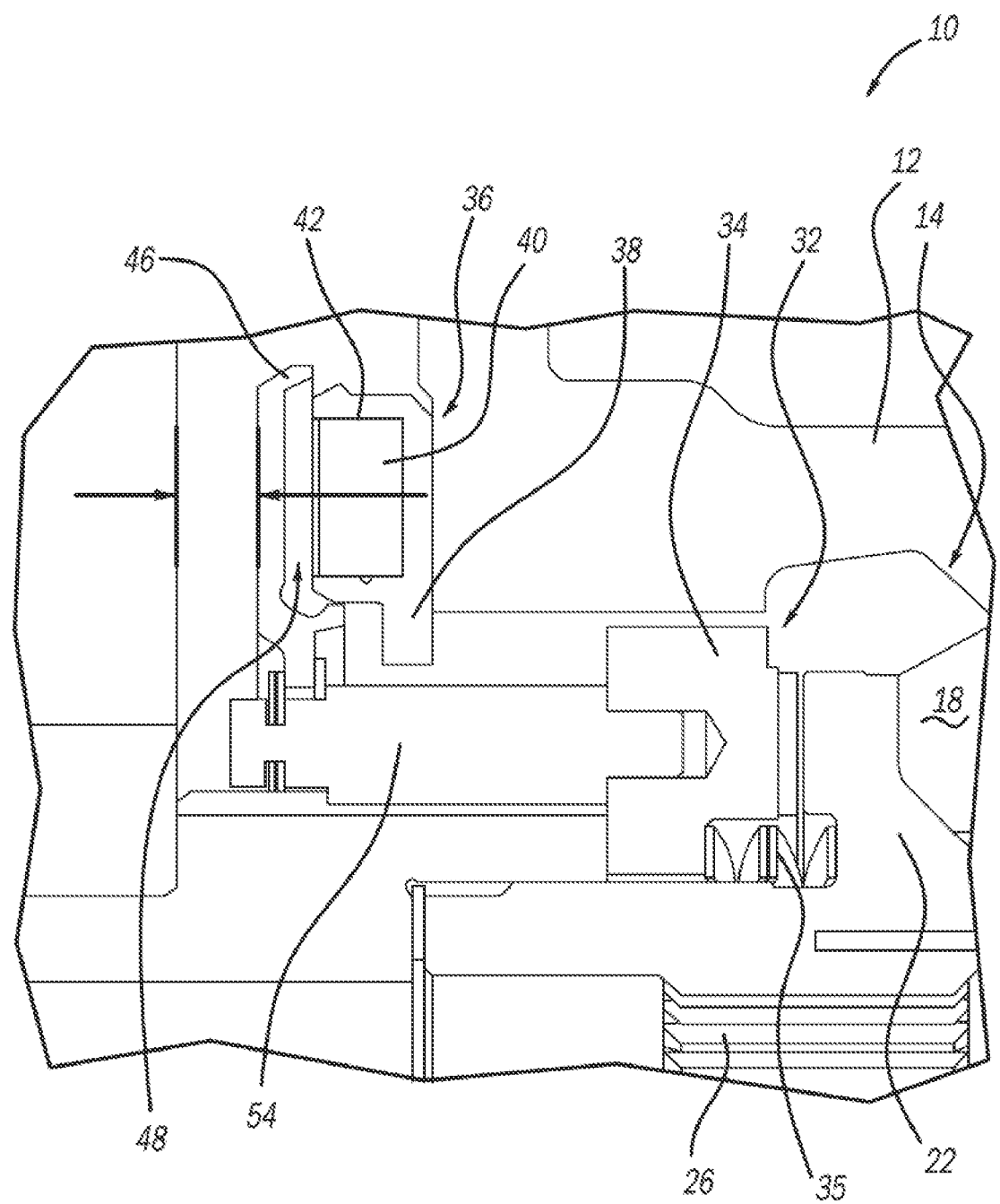
FIG. 2 is a partial sectional view of the electronically actuated locking differential of FIG. 1.

One representative example of an electronically actuated locking differential of the type contemplated by the present teachings is generally indicated at 10 in FIGS. 1 and 2. As shown in FIGS. 1 and 2, the differential 10 includes a gear case, generally indicated at 12, and an end cap (not shown), which may be fastened to the gear case 12 by any suitable fastener, such as by a plurality of bolts (not shown). The gear case 12 and end cap cooperate with each other to define a gear chamber, generally indicated at 14. The differential 10 can be housed within a differential case 15. Torque input to the differential 10 is typically by an input ring gear (not shown), which may be attached to a flange 16. A gear set is supported within the gear chamber 14 and has at least a pair of input pinion gears 18. The pinion gears 18 are mounted rotatably about a pinion shaft (not shown), which is secured relative to the gear case 12 by any suitable mechanism. The pinion gears 18 are input gears of the gear set and in meshing engagement with a respective pair of left and right side gears, 22 (one side gear shown in the FIGS). The side gears 22 define respective sets of internal, straight splines 26 (only one shown for gear 22) that are adapted to be in splined engagement with mating external splines on a respective pair of left and right axle shafts (not shown).

A rotation-prevention mechanism, generally indicated at 32, has a generally annular collar member or lock plate 34 and is disposed entirely within the gear case 12 and operably associated with side gear 22 (the first output gear). The lock plate 34 is spaced from the side gear 22 and is slidable along the outer surface of the side gear 22. The lock plate 34 is biased toward the non-actuated, "unlocked" mode by a return spring 35 such as a wave spring. An electronic actuator, generally indicated at 36, is disposed primarily external to the gear case 12. More specifically, the electronic actuator 36 is disposed at the end of and about the gear case 12 adjacent side gear 22 (the first output gear). The electronic actuator 36 has a stator 38 primarily external to the gear case 12. More specifically, the stator 38 is disposed at the end of and about the gear case 12 adjacent to the flange 16. The stator 38 is stationary and non-rotating relative to the gear case 12. The electronic actuator 36 also has an electromagnetic coil, generally indicated at 40, that is disposed in a cavity 42 of the stator 38. The electromagnetic coil 40 is energized by a pair of electrical leads 44 and receives direct current (DC) from a source (not shown). The electronic actuator 36 also has an armature, generally indicated at 46, spaced from the electromagnetic coil 40 to form a gap 48 therebetween. The armature 46 is mechanically coupled to the lock plate 34 by an annular slip ring 54.

The actuator 36 includes a sensor assembly 60 attached to the differential case 15 as will be described herein. The sensor assembly 60 is used to determine the position of the armature 46 relative to the stator 38 to interpret the state of the differential 10 in the locked, semi-engaged or unlocked condition. A signal can be sent from the sensor assembly 60 to a display or other vehicle instrumentation such as a cluster 62 (FIG. 1) to convey the state of the differential to the driver. The arrangement of the sensor assembly 60 and other configurations described herein isolates the sensor assembly 60 from the severe environment of the armature 46 (vibration, temperature) by moving the sense element or switch from directly contacting the armature 46 or stator 38. The present disclosure also limits the modification of the stator eliminating large mass or material additions requiring only a small added element that can be pressed into the stator 38 when needed.

During normal, straight-ahead operation of a vehicle within which the differential 10 is employed, no differentiation occurs between the left and right axle shafts or side gears 22, 24. Therefore, the pinion gears 18 do not rotate relative to the pinion shaft 20. As a result, the gear case 12, pinion gears 18, and side gears 22, 24 all rotate about an axis of rotation as if the gear case 12, pinion gears 18, and side gears 22, 24 are a solid unit.

When direct current (DC) power is supplied to the electromagnetic coil 40, magnetic energy is generated within the stator 38 which creates an attractive force between the armature 46 and stator 38 starting at around 40 pound-force (lbf) and ending at around 250 lbf and causing the armature 46 to move toward the stator 38. This force is transferred through the slip ring 54 and to the lock plate 34 compressing the return spring 35 until the lock plate 34 exerts a required retarding torque on the side gear 22, locking it to the differential case 12 and thus locking the LH and RH axle shafts independent of driveline rotation. It should be appreciated in light of the disclosure that the differential 10 allows the LH and RH axle shafts to remain locked independent of vehicle direction. It should also be appreciated in light of the disclosure that the differential 10 is preferred for applications where frequent rock cycles or direction reversals are common such as during snow plowing. It should further be appreciated in light of the disclosure that the differential 10 also enables ease of lock detection by repositioning the slip ring 54 away from the electromagnetic coil 40, allowing both the stator 38 and the armature 46 to remain stationary relative to the rotation of the differential 10.

The differential 10 may be controlled manually, wherein a driver of the vehicle manually selects "locked" mode (rather than "unlocked" mode) to operate the differential 10. For example, when, say the vehicle is at rest, the driver simply manually activates a switch or button (not shown), such as a simple momentary-type "on/off" toggle or rocker switch or push button, mounted to a dash or console (not shown) of the vehicle. In this way, an electric circuit (not shown) is closed, thereby turning on current in the circuit and a lamp (not shown) located in or near the toggle switch or push button to indicate to the driver that the differential is actuated. Current flows in the circuit and ultimately to the electromagnetic coil 48 of the differential 10. The differential 10 then operates in the "locked" mode (i.e., when the vehicle is in first gear or reverse). In this way, the first output gear 22 is locked relative to the gear case 12, preventing any further differentiation between the first output gear 22 and gear case 12.

By not allowing the armature 46 to rotate, parasitic losses can be eliminated when the differential 10 is locked because any frictional drag between the armature 46 and the stator 38 is eliminated. The electronic actuator 36 of the present teachings creates less heat within the differential 10 due to less friction. Since the armature 46 is mechanically coupled to the lock plate 34, locking and unlocking of the differential 10 can be detected or sensed based on the axial position of the armature 46.

Figure 3:
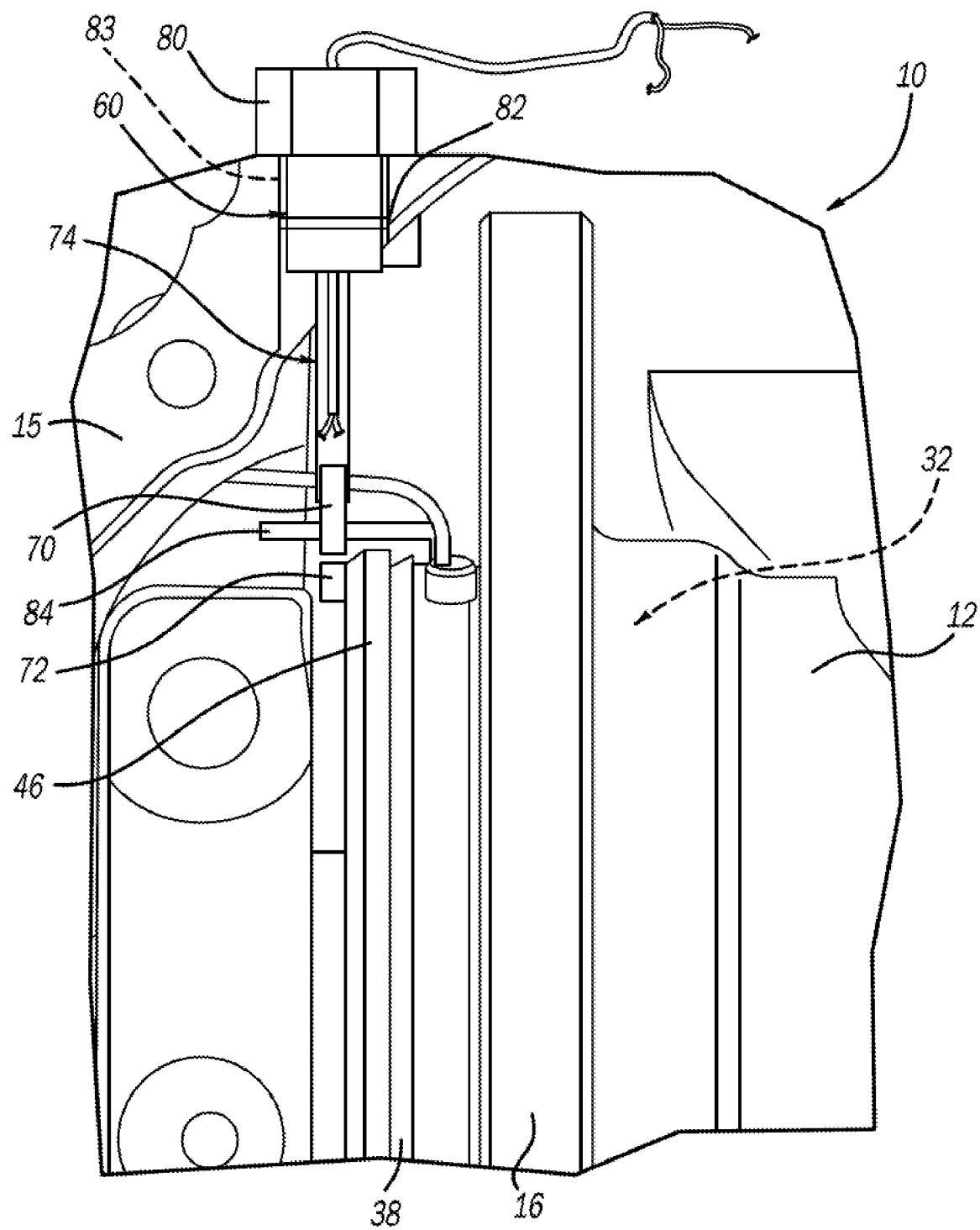
FIG. 3 is a side view of a sensor assembly constructed in accordance to one example of the present disclosure and shown mounted to a differential case.

With particular reference to FIG. 3, the sensor assembly 60 will be further described. The sensor assembly 60 generally includes a switch element 70 and a sense element such as a magnet 72. The switch element 70 is disposed in a sensor housing 74. The magnet 72 is coupled to the armature 46. The switch element 70 can be a magnetic reed configuration or an active sensor. During operation, the switch element 70 can change state based on the position of the magnet 72. In this regard, as the armature 46 (carrying the magnet 72) moves left and right and viewed in FIG. 3, the magnet 72 causes the switch element 70 to change state. For example, when the magnet 72 is in close proximity to the switch element 70, the switch element 70 is in a first state (such as closed) corresponding to armature 46 (and therefore the rotation-prevention mechanism 32) being in the engaged position. When the magnet 72 is caused to be moved away from the switch element 70, the switch element 70 is in a second state (such as open) corresponding to the armature 46 (and therefore the rotation-prevention mechanism 32) being in the disengaged position.

The sensor assembly 60 is connected to the differential case 15 by advancing a fastener head 80, such as a hex-head bolt into threadable engagement with the differential case 15. A compliant member such as an O-ring 82 can be arranged between the sensor housing 74 and the differential case 15. The configuration improves upon prior art designs as the switch element 70 simply mounts to the differential case 15. In some examples a bore 83 can be formed into the differential case 15 for receiving the switch element 70. An arm 84 extends from the stator 38. The arm 84 is used as a reference to align the switch element 70. During assembly, when the sensor housing 74 and switch element 70 is inserted into the differential case 15 it can be fixtured to the arm 84. In some examples, the sensor housing 74, or parts thereof can be flexible allowing the switch element 70 to locate relative to the arm 84, such as by referencing a slot feature in the arm prior to tightening the fastener head 80 onto the differential case 15. In this regard, the location of the switch element 70 is known and a reference point is therefore known. Movement of the armature 46 (by way of the magnet 72) can then be used to discern the state of the rotation-prevention mechanism 32.

With particular reference to FIG. 4A, a sensor assembly 160 according to another example of the present disclosure will be further described. Like components are referenced by like reference numerals increased by 100. The sensor assembly 160 generally include a switch element 170 and magnet 172. The switch element 170 and the magnet 172 are both disposed in a sensor housing 174. The magnet 172 is disposed on a magnet mount 176 that is in turn coupled to the armature 146 by way of a detent mechanism 178. The detent mechanism 178 is fixed to the armature 146 and can include a ball 178A and a biasing member 178B. It is contemplated that the ball 178A of the detent mechanism 178 can nest into a recess 176A provided on the magnet mount 176. An alternate detent mechanism 178' is also shown in FIG. 4C. It is appreciated that other detent mechanisms may be used. The switch element 170 can be a magnetic reed configuration or an active sensor. During operation, the switch element 170 can change state based on the position of the magnet 172. In this regard, as the armature 146 (carrying the magnet 172) moves left and right and viewed in FIG. 4A, the magnet 172 causes the switch element 170 to change state. For example, when the magnet 172 is in close proximity to the switch element 170, the switch element 170 is in a first state (such as closed) corresponding to armature 146 (and therefore the rotation-prevention mechanism 132) being in the engaged position. When the magnet 172 is caused to be moved away from the switch element 170, the switch element 170 is in a second state (such as open) corresponding to the armature 146 (and therefore the rotation-prevention mechanism 132) being in the disengaged position.

The sensor assembly 160 is connected to the differential case 115 by advancing a fastener head 180, such as a hex-head bolt into threadable engagement with a threaded bore 183 on the differential case 115. A compliant member such as an O-ring 182 can be arranged between the sensor housing 174 and the differential case 115. The configuration improves upon prior art designs as the instant design as the switch element 170 simply mounts to the differential case 115. In some examples the bore 183 can be formed into the differential case 115 for receiving the switch element 170. An arm 184 extends from the stator 138. The arm 184 is used as a reference to align the sensor housing 174. During assembly, when the sensor housing 174 and switch element 170 is inserted into the differential case 115 it can be fixtured to the arm 184. The sensor housing 174 is flexible allowing it to locate relative to the arm 184, such as by referencing a slot feature in the arm 184 prior to tightening the fastener head 180 onto the differential case 115. In this regard, the location of the switch element 170 is known and a reference point is therefore known. Movement of the armature 146 (by way of the magnet 172) can then be used to discern the state of the rotation-prevention mechanism 132.

Figure 5:
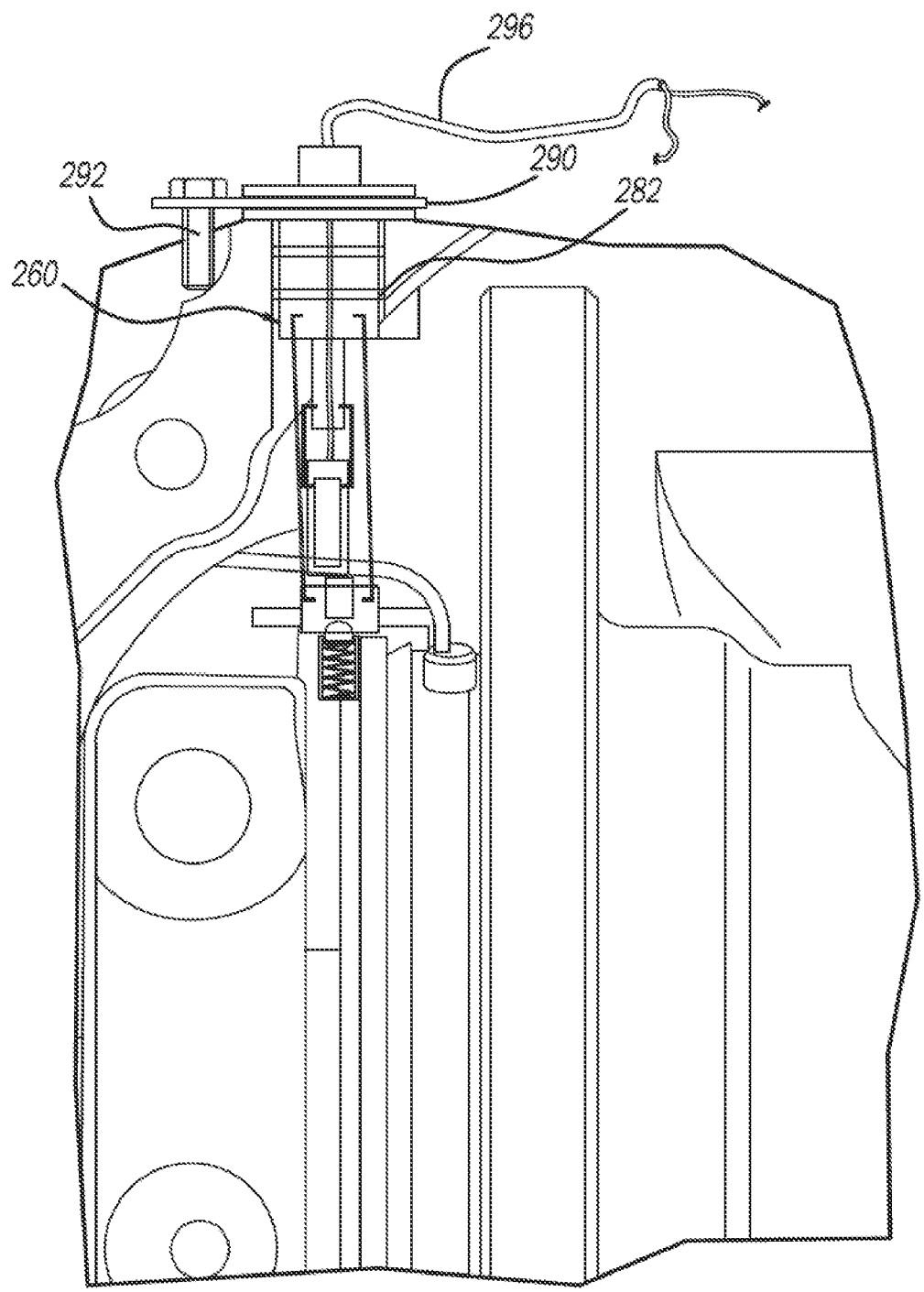
FIG. 5 is a side view of a sensor assembly constructed in accordance to another example of the present disclosure and shown mounted to a differential case.

FIG. 5 illustrates a sensor assembly 260 according to another example of the present teachings. The sensor assembly 260 is constructed similar to the sensor assembly 160 except as identified below. The sensor assembly 260 is mounted to the differential case 215 by way of a mounting bracket 290. The mounting bracket 290 is coupled to the differential case 215 by a bolt 292. One or more O-rings 282 can be arranged around the sensor assembly 260. By using the mounting bracket 290, tangling of wires 296 can be mitigated.

Figure 6:
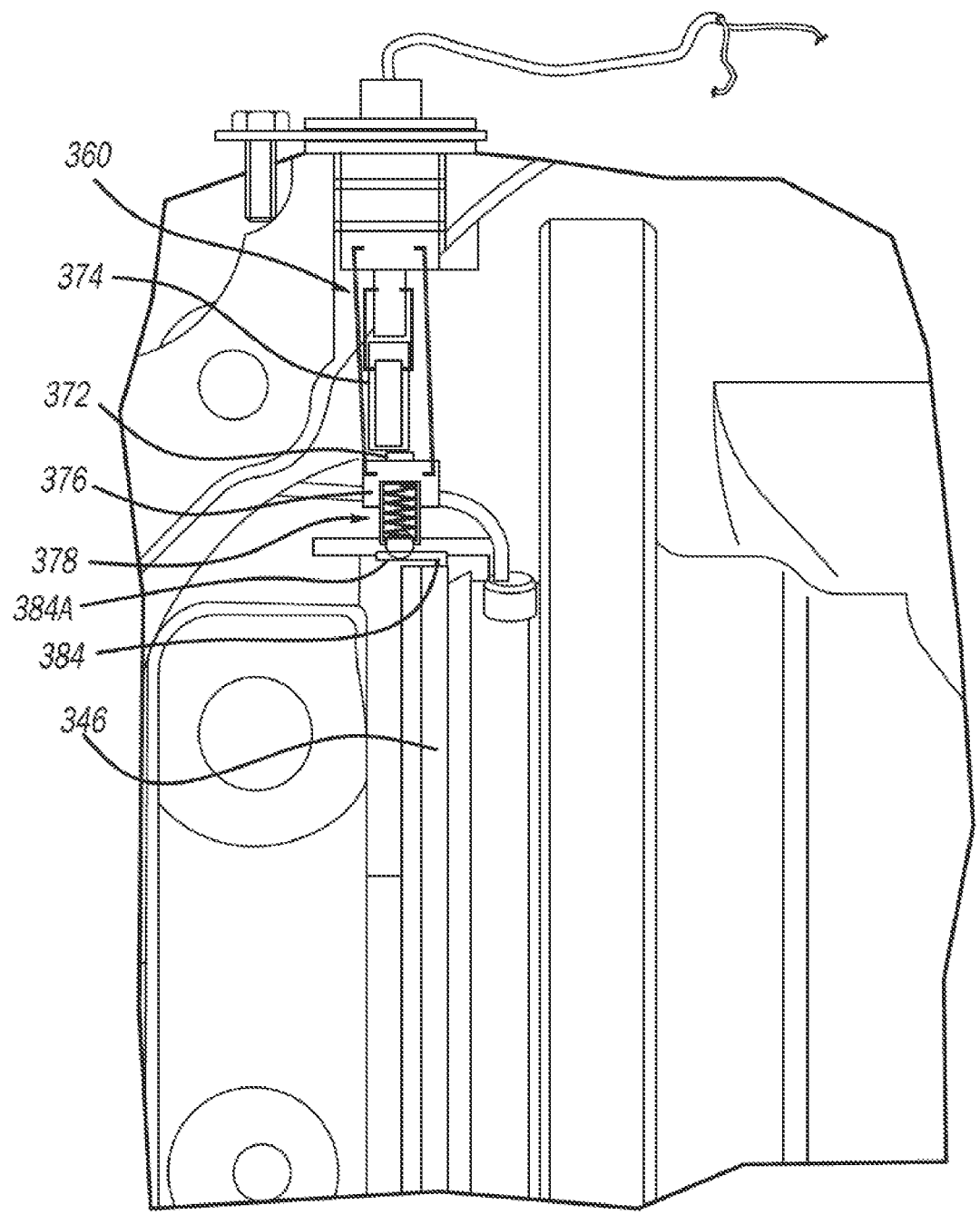
FIG. 6 is a side view of a sensor assembly constructed in accordance to yet another example of the present disclosure and shown mounted to a differential case.

FIG. 6 illustrates a sensor assembly 360 according to another example of the present teachings. The sensor assembly 360 is constructed similar to the sensor assembly 260 except as identified below. The sensor assembly 360 incorporates a coupling link or detent mechanism 378 into the sensor housing 374 of the sensor assembly 360. Specifically, the detent mechanism 378 is incorporated into the magnet mount 376. The ball of the detent mechanism 378 can be configured to locate relative to a depression or other locating feature 384A on the arm 384. Once the detent mechanism 378 has coupled to the locating feature 384A on the arm 384, the detent mechanism 378 remains fixed to the arm 384 and the sensor housing 374 allows the magnet mount 376 to swing left and right as viewed in the drawings as a result of the armature 346 moving between the engaged and disengaged positions.

Figure 7A:
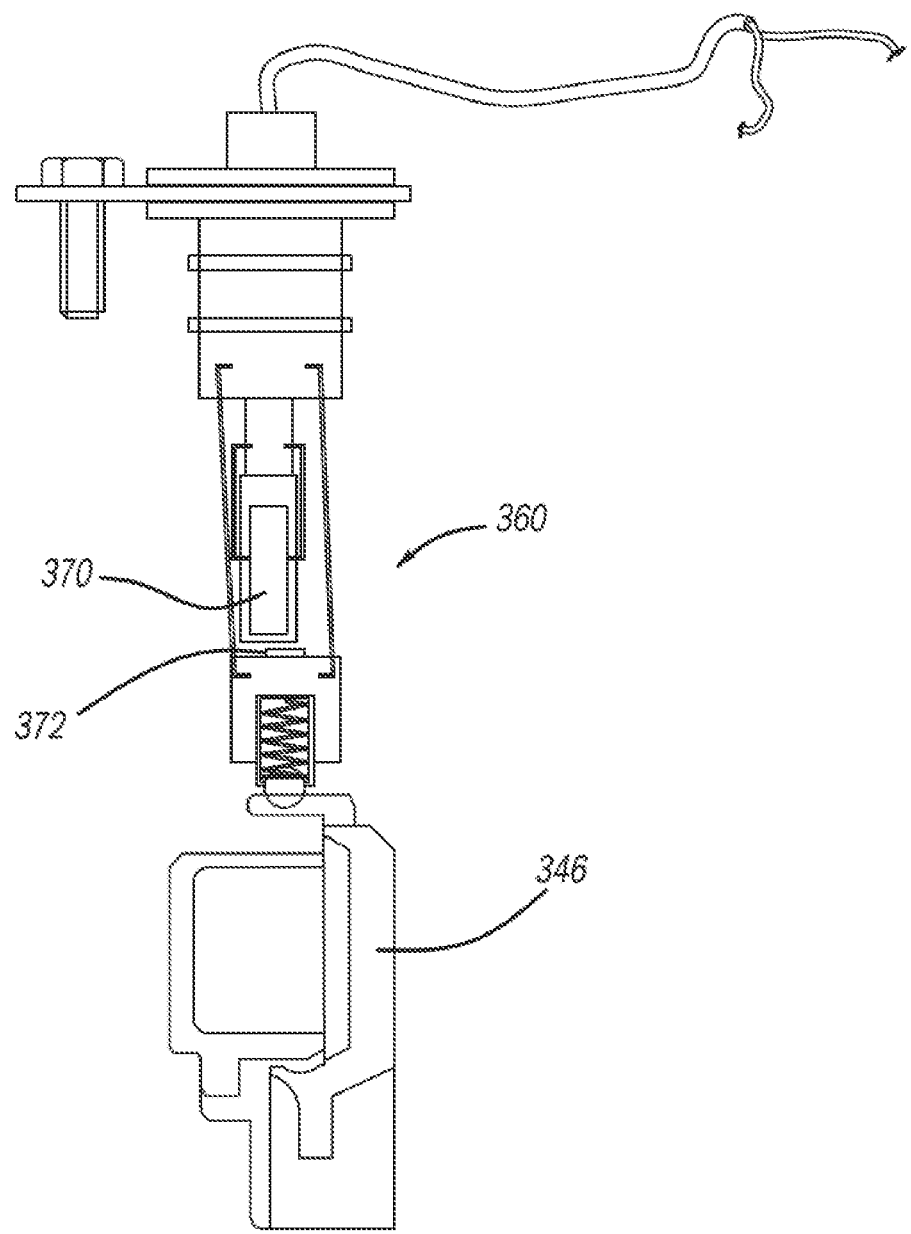
FIG. 7A is a side view of the sensor assembly of FIG. 6 and shown with the armature disengaged and the switch open.
Figure 7B:
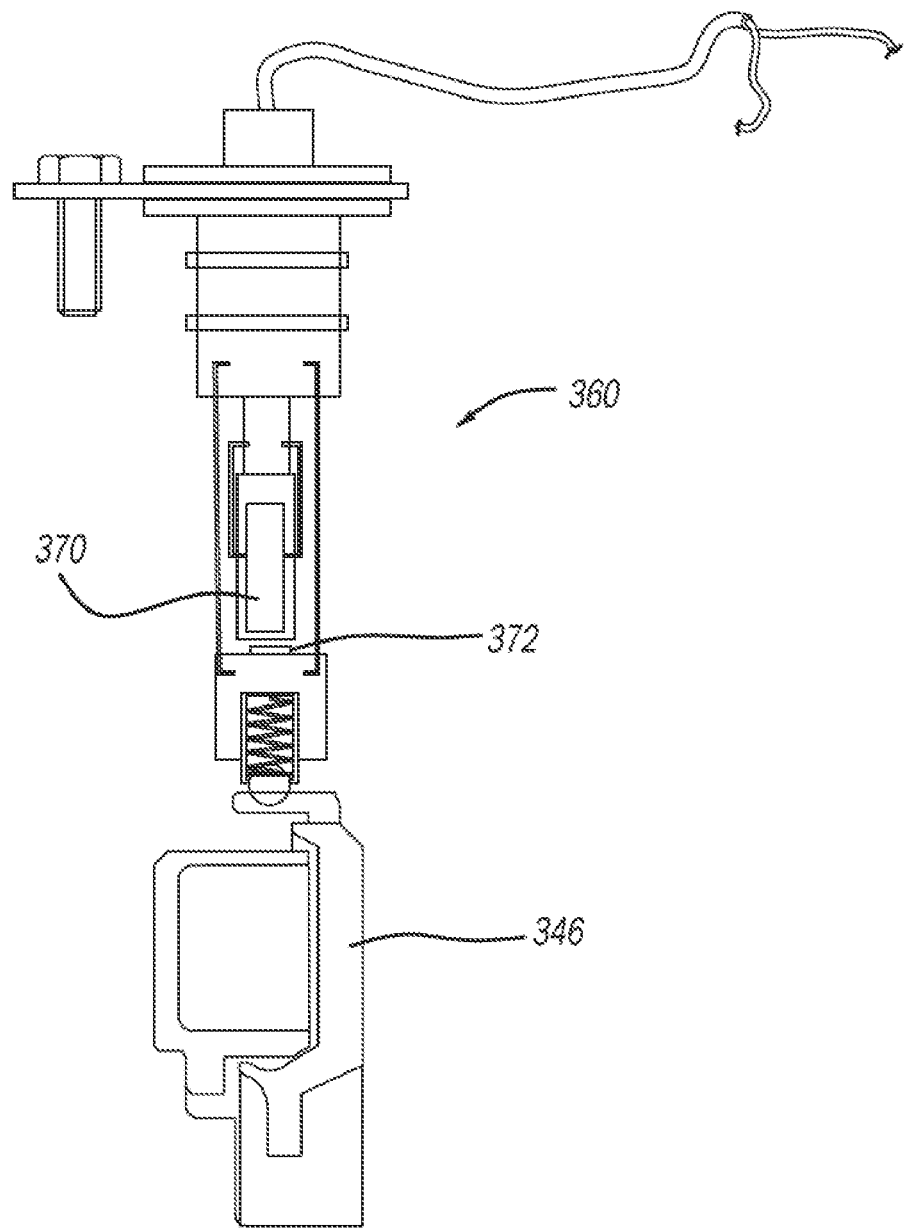
FIG. 7B is a side view of the sensor assembly of FIG. 7A and shown with the armature engaged and the switch closed.
Figure 8A:
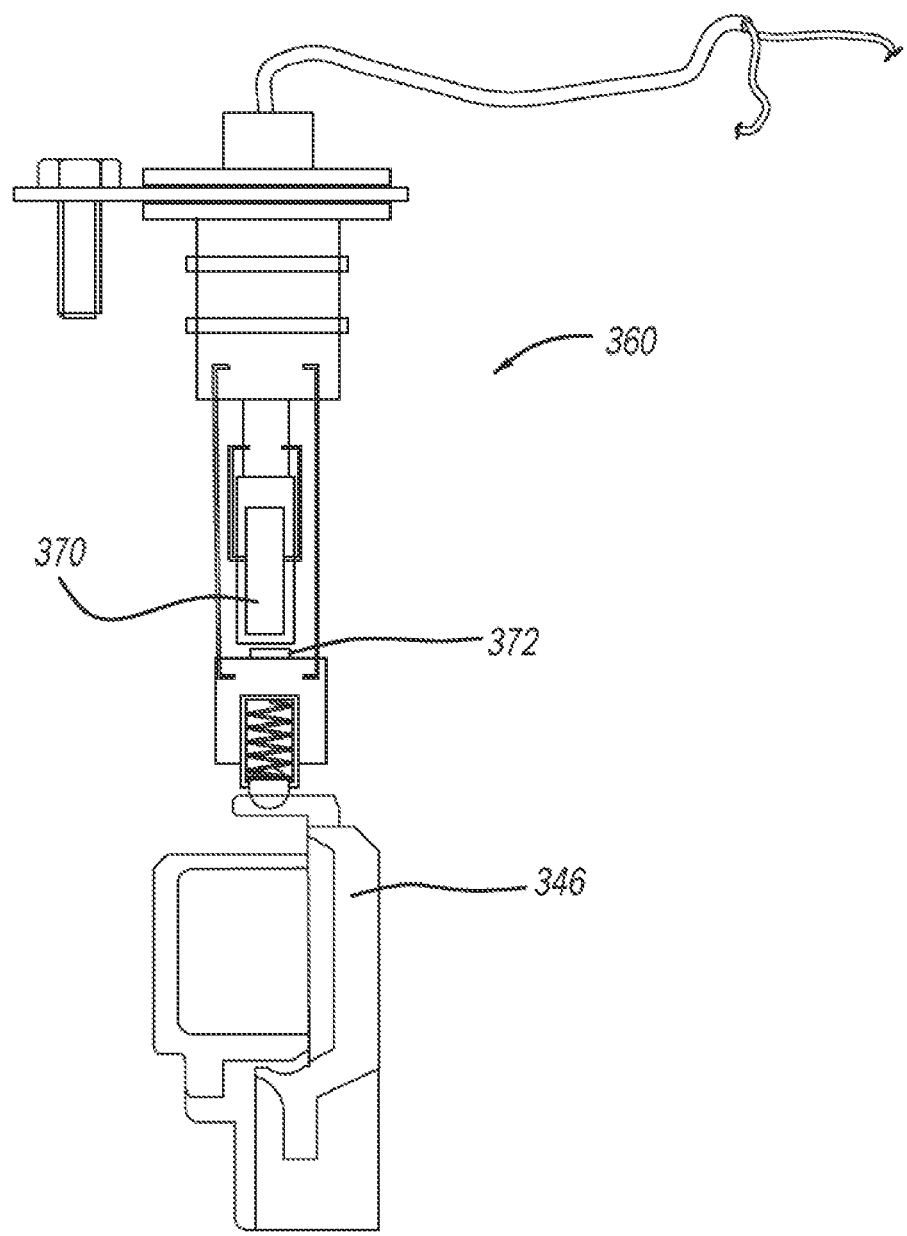
FIG. 8A is a side view of the sensor assembly of FIG. 6 and shown with the armature disengaged and the switch open.
Figure 8B:
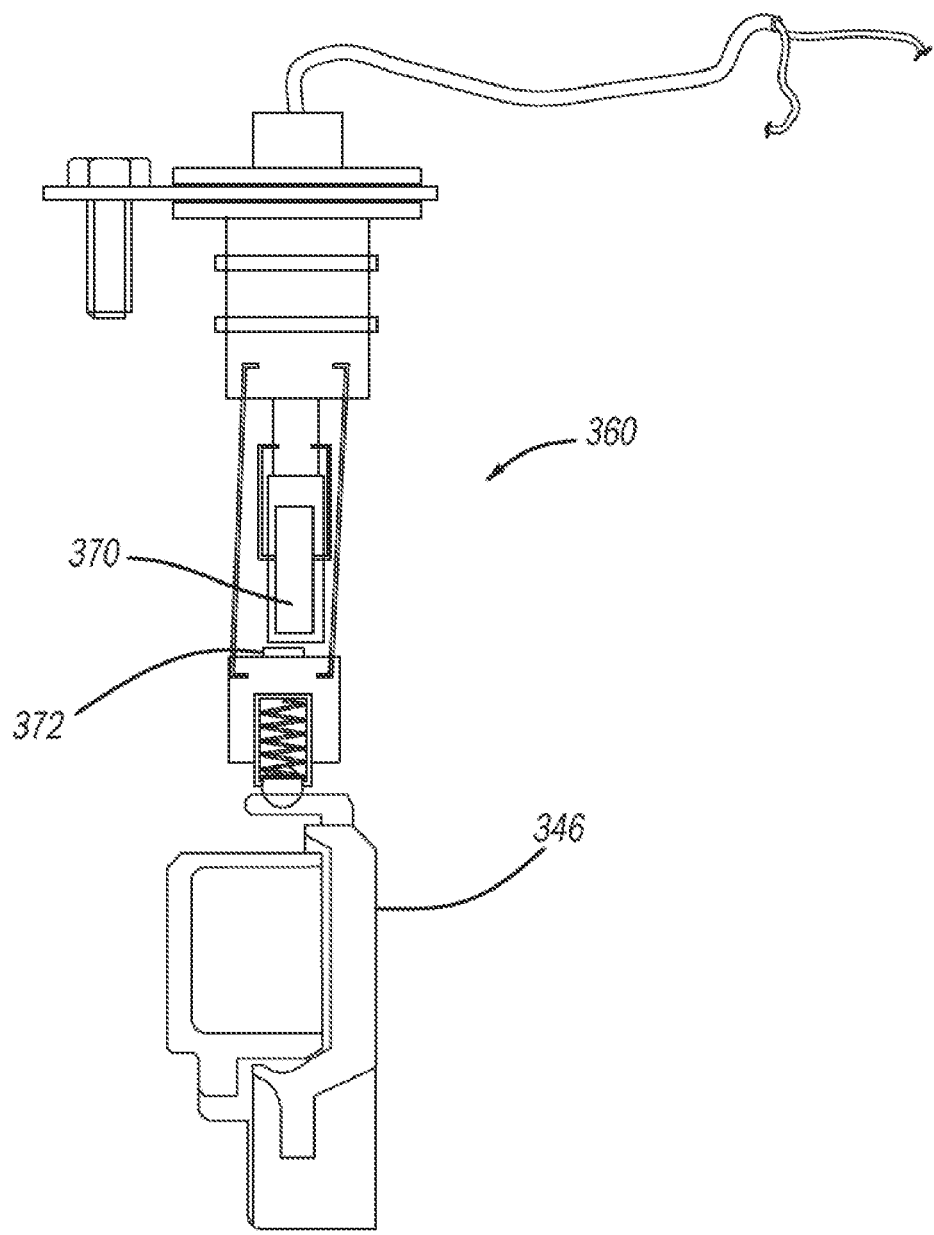
FIG. 8B is a side view of the sensor assembly of FIG. 8A and shown with the armature engaged and the switch closed.
Figure 10:
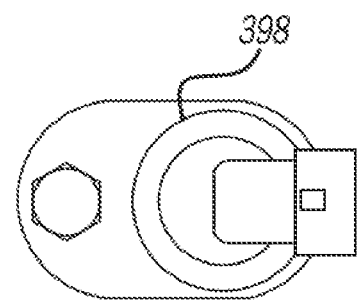
FIG. 10 is a top view of the molded connector body of the sensor assembly of FIG. 9B.
Figure 11:
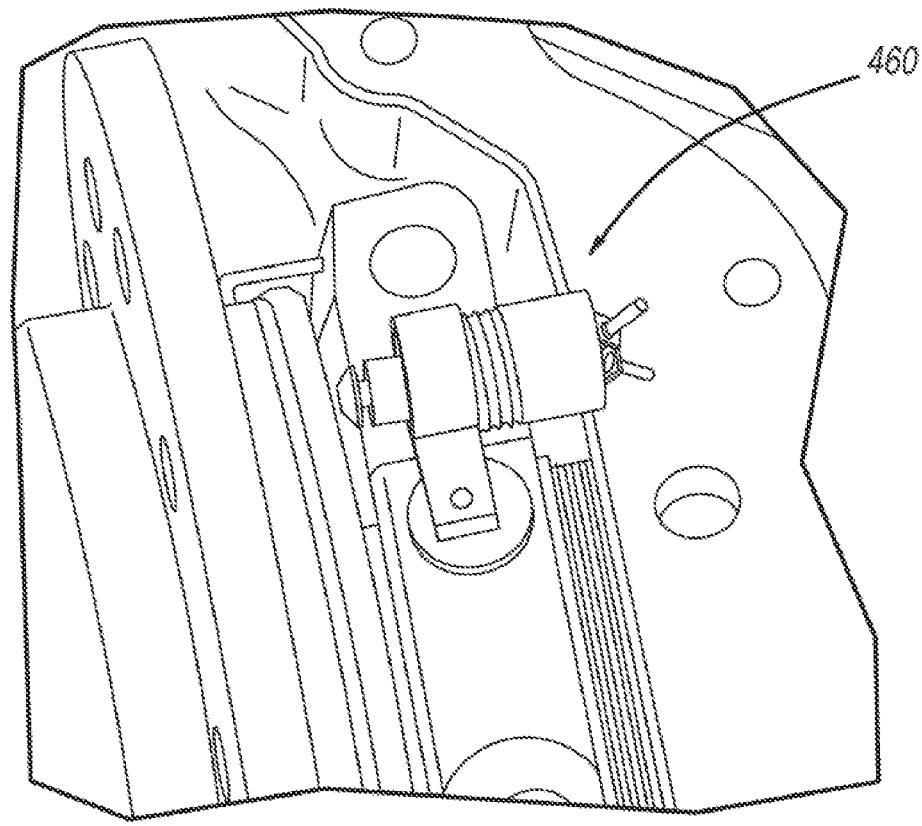
FIG. 11 is a side view of a sensor constructed in accordance to one prior art configuration and shown mounted to a differential case.

FIGS. 7A and 7B illustrate one installation configuration for the sensor assembly 360. FIGS. 8A and 8B illustrate another configuration for the sensor assembly 360. Both configurations will account for the armature 346 being engaged or disengaged during installation of the sensor assembly 360. In FIGS. 7A and 8A, the armature 346 is disengaged at installation. In FIG. 7A, and the switch 370 is in an open position. In FIG. 8A, the switch 370 is in a closed position. When the armature 346 moves to the engaged position in FIG. 7B, the switch 370 closes. When the armature 346 moves to an engaged position in FIG. 8B, the switch 370 opens. Regardless, the switch 370 can be configured to open or closed as desired. The necessary input is a state change where control can determine the rotation-prevention mechanism has changed from one of the locked and unlocked positions to the other of the locked and unlocked positions. FIGS. 9A-10 illustrate another example of the sensor assembly 360 that incorporates a molded connector body 398. FIG. 11 illustrates a sensor assembly 460 according to a prior art configuration.

The teachings have been described in great detail in the foregoing specification, and it is believed that various alterations and modifications of the many aspects of the present teachings will become apparent to those having ordinary skill in the art from a reading and understanding of the specification. It is intended that all such alterations and modifications are included in the teachings, insofar as they come within the scope of the appended claims.

The invention claimed is:

1. A sensor assembly configured for use with a locking differential received in a differential case, the sensor assembly configured to determine a position of an armature in relation to a stator, the armature moving relative to the stator between engaged and disengaged positions corresponding to the locking differential being in a locked and unlocked state, the sensor assembly comprising:
   a sensor housing coupled relative to the differential case of the locking differential;
   a switch element disposed in the sensor housing;
   a sense element that moves with the armature; and
   an arm configured to extend from one of the armature and the stator;
   wherein the sensor housing is fixtured to the arm during assembly such that the arm is a reference to align and locate the sensor housing when the sensor housing is inserted into the differential case,
   wherein the sensor assembly is configured to change state based on a position of the sense element, and
   wherein the sense element is integrated into the sensor housing.

2. The sensor assembly of claim 1, wherein the sense element is a magnet.

3. The sensor assembly of claim 1, wherein the sense element is coupled to the armature.

4. The sensor assembly of claim 1, wherein the sense element is disposed on a mount and wherein the sensor assembly further comprises a detent mechanism that operably couples the mount relative to the armature.

5. The sensor assembly of claim 4, wherein the detent mechanism is fixed to the armature or the mount.

6. The sensor assembly of claim 5, wherein the detent mechanism is fixed to the mount and includes a ball that locates relative to a depression formed on the arm, which extends from the stator.

7. The sensor assembly of claim 1, wherein the sensor housing is configured to flex during movement of the armature between the engaged and disengaged positions.

8. The sensor assembly of claim 1, wherein the sensor housing further comprises a molded connector body.

9. The sensor assembly of claim 1, wherein the sensor assembly is coupled to the differential case by a fastener, wherein optionally the fastener is a threaded fastener and wherein the sensor assembly is connected to the differential case by the threaded fastener advanced into a complementary threaded bore defined in the differential case.

10. The sensor assembly of claim 1, wherein the sensor assembly communicates a signal to vehicle instrumentation to convey a state of the differential.

11. A method of installing a sensor assembly relative to a locking differential, the locking differential having a differential case, a rotation prevention mechanism, and an actuator having an armature and a stator, the method comprising:
   forming a bore in the differential case configured to receive the sensor assembly;
   advancing the sensor assembly through the bore defined in the differential case;
   locating a switch element of the sensor assembly relative to a sense element disposed on the armature by fixturing a portion of the sensor assembly to an arm extending from one of the armature and the stator;
   fixing the sensor assembly to the differential case; and
   coupling a magnet mount to the armature by locating a ball of a detent mechanism disposed on the armature into a recess provided on the detent mechanism.

12. The method of claim 11, wherein fixing the sensor assembly comprises threadably tightening a fastener relative to a complementary threaded bore defined in the differential case.

* * * * *